United States Patent [19]
Horowitz et al.

[11] 3,920,045
[45] Nov. 18, 1975

[54] RELAY EMERGENCY VALVE

[75] Inventors: Charles F. Horowitz, Niles; Boleslaw Klimek, Des Plaines, both of Ill.

[73] Assignee: The Berg Manufacturing Company, Des Plaines, Ill.

[22] Filed: Jan. 22, 1974

[21] Appl. No.: 435,428

[52] U.S. Cl.............................. 137/627.5; 303/29
[51] Int. Cl.[2]......................................... F16K 31/12
[58] Field of Search ............ 137/627.5; 303/13, 14, 303/29

[56] References Cited
UNITED STATES PATENTS

| | | | |
|---|---|---|---|
| 2,937,052 | 5/1960 | Gates | 303/29 |
| 3,059,975 | 10/1962 | Morse | 303/29 |
| 3,439,958 | 4/1969 | Gruner et al. | 303/29 X |

*Primary Examiner*—Robert G. Nilson
*Attorney, Agent, or Firm*—Neuman, Williams, Anderson & Olson

[57] ABSTRACT

A relay emergency valve has a service pressure operated piston effective to move a shuttle to open communication between brake ports and a tank port. A second piston, positioned within the housing, is responsive to pressure at a supply port, and upon a drop in supply pressure, is effective to move a portion of the first piston to cause the shuttle to open communication between the tank and brake delivery ports to cause operation of the brakes.

7 Claims, 3 Drawing Figures

RELAY EMERGENCY VALVE

SUMMARY OF THE INVENTION

The present invention relates to a relay emergency valve for use in a vehicle air brake system and has particular relation to such a valve having means for valve operation in response to a drop in the emergency or supply pressure.

Another purpose is a simply constructed reliably operable valve of the type described.

Another purpose is a relay emergency valve for use on dollies of the type used in connection with tractor-trailer combinations.

Another purpose is a relay emergency valve including a pair of spaced pistons, with one piston being movable in response to a drop in supply line pressure and causing movement of the other piston, which in turn moves a shuttle to open communication between a protected tank and the air brakes.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

In one type of vehicle air brake system, when the emergency or supply line to the trailer has a reduction in pressure, the spring brakes on the trailer are automatically applied. In the case of a dolly, which is used with a trailer to support the trailer in place of the normal fifth wheel on a tractor so as to provide one or more trailers in tandem, there are normally no spring brakes. Hence, when there is a drop in supply line pressure, the pressure from a protected tank on the dolly must be used to cause operation of the brakes. The present relay emergency valve will be mounted on the dolly and will have connections to the service and supply lines and to the protected tank on the dolly in such a manner that when there is a drop in supply line pressure, the relay valve will cause the pressure from the protected tank on the dolly to effect brake operation.

Figure 1:
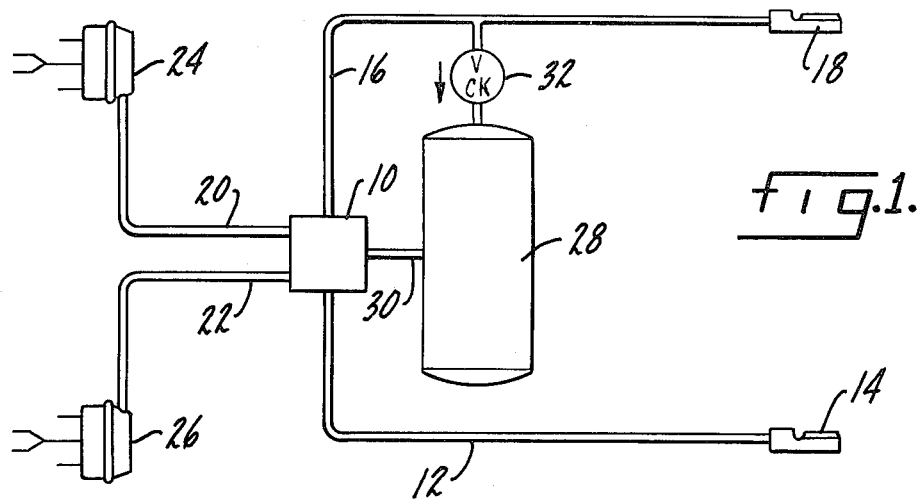
FIG. 1 is a diagrammatic illustration of the relay emergency valve disclosed herein within a vehicle air brake system.

In FIG. 1, the relay emergency valve is indicated at 10 and may be connected by a line 12 to a service gladhand 14. The service gladhand will normally be connected to a foot pedal or similar actuator for use in applying the brakes. A supply line is indicated at 16 and is connected to the valve 10 and to a supply gladhand 18 which will conventionally be connected to the emergency or supply source on the tractor. Lines 20 and 22 may be connected to the relay emergency valve 10 and to air brakes indicated at 24 and 26. A protected tank 28 is connected by a line 30 to the relay emergency valve 10 and through a check valve 32 to the supply line 16.

Figure 2:
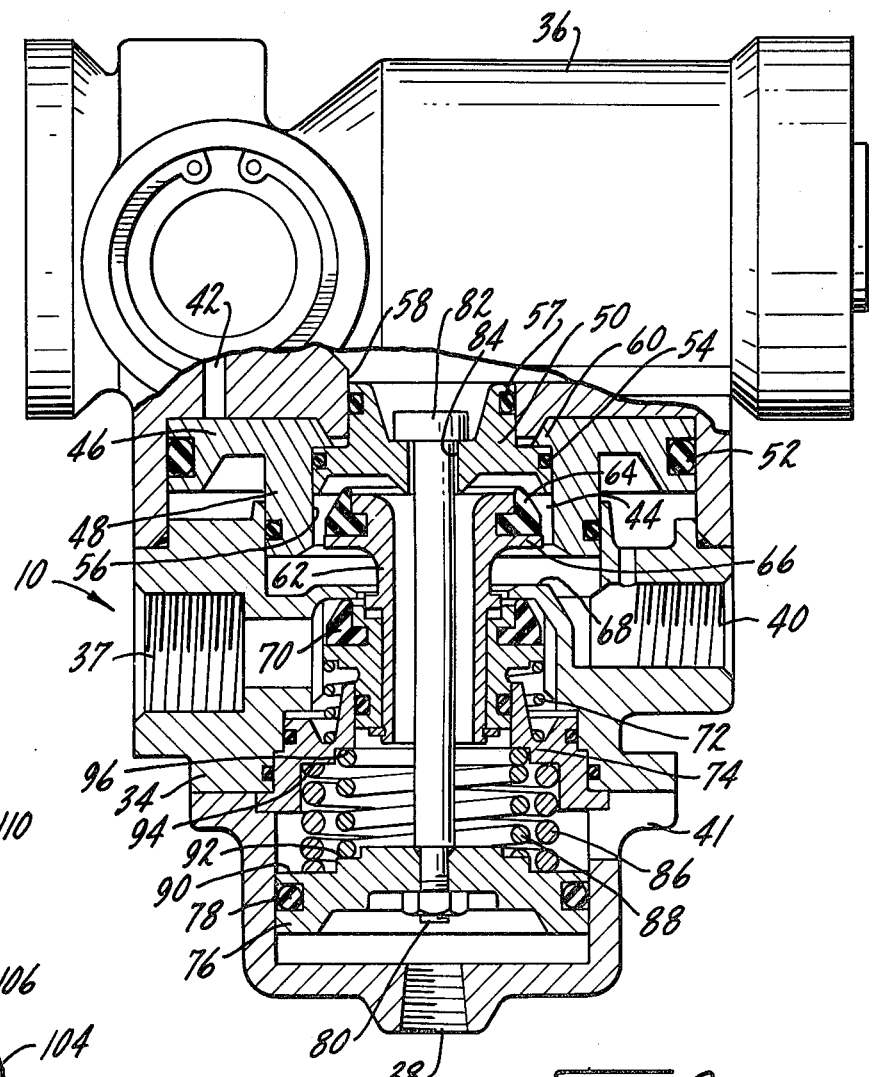
FIG. 2 is an axial section through a valve of the type described.

One form of relay emergency valve is shown in FIG. 2 and includes a housing 34 having an anti-lock or anti-skid device 36 mounted on top thereof. The relay emergency valve shown herein may be used in connection with a conventional anti-lock device and the pneumatic logic connected therewith. However, such a combination is not necessary in all applications.

The housing 34 has a tank port 37, a supply port 38, a pair of delivery ports, one of which is indicated at 40, an exhaust port 41, and a service conduit 42 which will be connected, through the anti-lock device 36, to the service line 12. The tank port 37 will be connected through line 30 to the tank 28, the delivery ports 40 through lines 20 and 22, to the brakes 24 and 26 and the supply port 38 through line 16, to the supply gladhand 18.

Movable within a chamber 44 in the housing 34 is a first piston 46 having an outer portion 48 and an inner portion 50. There is a seal ring 52 carried by piston portion 48 which bears against the wall of housing 34. Inner piston portion 50 has a seal ring 54 bearing against a surface 56 of the outer piston portion 48 and a further seal ring 57 which bears against the wall of chamber 58 formed by housing 34. The outer piston portion 48 has an inwardly extending annular lip 60 which overlies the inner piston portion 50 so that when the outer portion 48 moves downwardly, in response to an air pressure signal in conduit 42, both piston portions will move together. However, when the inner piston portion 50 is drawn downwardly, as explained hereinafter; it is free to move without portion 48.

Also positioned within chamber 44 is a shuttle 62 carrying an upper annular seal 64 which is positioned to seal against the lower curved surface of the inner piston portion 50, closing communication with exhaust port 41. The shuttle 62 also has an outwardly extending annular flange 66, supporting the seal 64, and positioned to contact an inwardly extending annular wall 68 of housing 34 to limit downward movement of the shuttle.

The shuttle further carries a second annular seal 70 which is positioned to bear against the lower surface of annular wall 68 and thus prevent communication between delivery port 40 and tank port 37 when the shuttle is in the position shown.

A coil spring 72 is seated against a lower collar member 74, fixed to housing 34, and urges the shuttle 62 in the upward direction shown in FIG. 2, or to a position preventing communication between delivery port 40 and tank port 37.

Positioned near the bottom of chamber 44 is a second piston 76 having an outer seal 78 bearing against the housing 34. Piston 76 masks supply port 38 and has a rod 80 attached thereto, which rod extends upwardly through the shuttle 62 and terminates in a head 82 positioned on the upper side of inner piston portion 50. The rod 80 may pass loosely through a passage 84 in the piston portion 50.

First and second coil springs 86 and 88 are seated against adjacent stepped surfaces 90 and 92 on the top of piston 76 and are seated on similar adjacent and stepped surfaces 94 and 96 on the bottom of collar 74. Thus, piston 76 is urged in a downward direction by springs 86 and 88, toward supply port 38, and in a direction which would tend to pull inner piston portion 50 downwardly, through connecting rod 80.

Under normal operating conditions, tank 28 will be fully pressurized by the air pressure in line 16 as protected by check valve 32. When an air signal appears on line 20, conventionally caused by foot pedal operation by the vehicle operator, air pressure in service conduit 42 will cause movement of piston portions 48 and 50, as a unit, in a downward direction. Inner piston portion 50 will be moved downwardly by cooperating annular lip 60 on outer piston portion 48. As the pistons move downwardly, the lower surface of inner piston portion 50 will contact seal 64, sealing the service conduit from exhaust port 41, and causing downward movement of shuttle 62. As the shuttle 62 moves downwardly, seal 70 will move away from the lower surface of wall 68, opening communication between tank port 37 and delivery ports 40, thus applying brake pressure to the ports 40 and to the brakes 24 and 26. Any pressure depleted from the tank by this operation will be immediately supplied through line 16 past check valve 32. Upon termination of service pressure, the shuttle and piston will return to their normal position as air pressure from the brakes will cause these elements to move to the position of FIG. 2.

In the event of a drop in supply pressure in line 16, vehicles are required to have means for automatically applying braking pressure. In this instance, such an application of brake pressure is brought about from protected tank 28. Normally, piston 76 will be balanced in the position shown by the force of springs 86 and 88 and the supply pressure at port 38. In the event of a drop in supply pressure, the springs 86 and 88 will move piston 76 toward supply port 38, which through the connection of rod 80, will move inner piston portion 50 downwardly toward shuttle 62. As piston portion 50 contacts shuttle 62, communication will be opened between tank port 37 and brake delivery ports 40, thus applying air pressure to the brakes.

The amount of pressure applied to the brakes will be directly related to variations in supply pressure. As supply pressure increases, piston 76 will move upwardly, tending to reduce the size of the passage between tank port 37 and delivery ports 40. In like manner, as supply pressure is diminished, piston 76 will move closer to the supply port, causing a further opening in the communication between the tank port and the delivery ports. Thus, the application of pressure to the brakes will be modulated in accordance with variations in supply pressure as applied to supply port 38.

Figure 3:
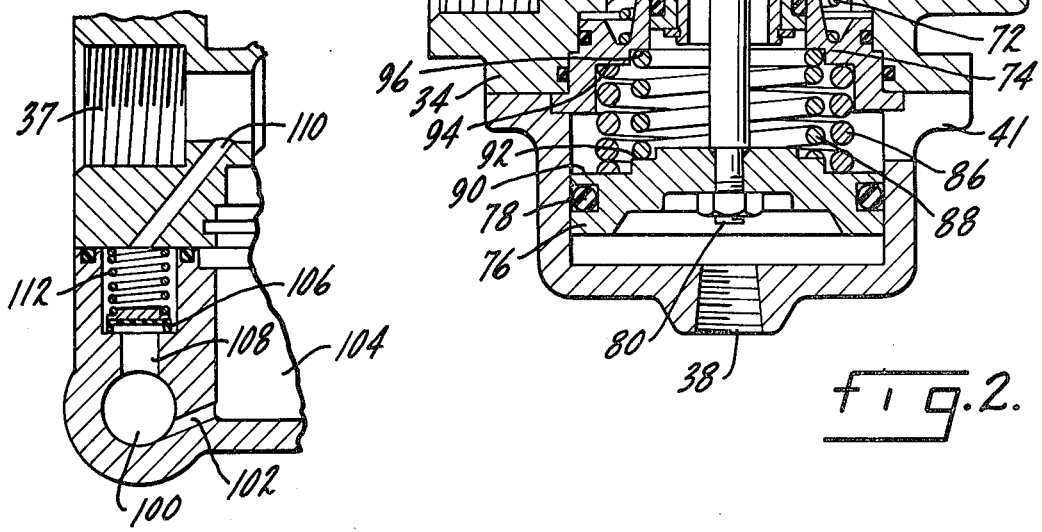
FIG. 3 is a partial axial section through a modified form of relay emergency valve.

FIG. 3 shows a modification of the valve 10 in which the check valve, indicated at 32 in FIG. 1, has been incorporated within housing 34 of the valve 10. As shown in FIG. 3, the supply port is indicated at 100 and connects through a passage 102 to a chamber 104 beneath piston 76. A check valve member 106 closes a passage 108 which connects supply port 100, through a passage 110, with tank port 37. Check valve member 106 is biased by a coil spring 112 to close passage 108. Under normal operating conditions, supply port 100 will provide the necessary air pressure to maintain the pressure in tank 28 at the prescribed level. In the event of a drop in supply pressure, check valve 106 prevents any escape of air pressure from tank 28. In other respects, the valve of FIG. 3 operates in the same manner as the valve of FIG. 2.

Many of the details of the operation of the shuttle and the first piston are shown in co-pending application Ser. No. 364,306, filed May 29, 1973, now U.S. Pat. No. 3,858,610 and assigned to the assignee of the present application.

Of particular importance in the invention is the means by which a reduction in supply pressure causes the application of pressure to the brakes from the protected tank, which is normally maintained itself at a predetermined level by supply pressure. The amount of pressure applied to the brakes is directly related to variations in supply pressure and hence the application of the brakes will be modulated by such variations.

Whereas the preferred form of the invention has been shown and described herein, it should be realized that there may be many modifications, substitutions and alterations thereto.

The embodiments of the invention in which an exclusive property or privilege is claimed are defined as follows:

1. A relay emergency valve including a housing having a supply port, a delivery port, a service port and a tank port, a first piston movable in said housing in response to air pressure at said service port, a shuttle movable in said housing, said shuttle including a hollow body, generally tubular in form and including seal means disposed at an intermediate point along the length of said shuttle, said housing including an inwardly extending annular wall, said shuttle being disposed to move at least partially within said annular wall, spring means normally biasing said shuttle to close communication between said tank and delivery ports by engaging said seal means with said annular wall, movement of said first piston in response to air pressure at said service port causing said first piston to contact said shuttle and move said shuttle to open communication between said tank and delivery ports by terminating the engagement of said seal means with said annular wall, and a second piston movable in said housing and covering said supply port, means connecting said first and second pistons, spring means biasing said second piston away from said first piston and toward said supply port, a drop in pressure at said supply port causing said second piston to move toward said supply port and move said first piston into contact with said shuttle and move said shuttle to open communication between said tank and delivery ports said first piston including an outer portion and an inner portion, with said inner portion being connected to said second piston, said shuttle including an annular seal at one end thereof for engaging said inner portion of said first piston, and said shuttle selectively providing communication between said delivery port and said exhaust port through its hollow body.

2. The structure of claim 1 further characterized in that said connecting means includes a rod of a substantially lesser diameter than the inside diameter of said hollow shuttle body extending through said hollow shuttle body between said second piston and the inner portion of said first piston.

3. The structure of claim 2 further characterized by and including cooperating means on the inner and outer portions of said first piston causing said inner portion to move with said outer portion, but permitting said inner portion to move independently of said outer portion.

4. The structure of claim 3 further characterized in that said cooperating means includes an inwardly-extending annular lip on the outer portion of said first piston overlying the inner portion of said first piston.

5. The structure of claim 1 further characterized by and including passage means between said supply port and tank port, and check valve means positioned in said passage means.

6. The structure of claim 1 further characterized by and including a collar positioned within said housing, said shuttle being at least partially movable within said collar, with said second piston spring means being seated against said collar.

7. The structure of claim 1 further characterized by and including seal means between said second piston and housing closing communication between said supply port and said delivery and service ports.

* * * * *